(12) United States Patent
Kondo et al.

(10) Patent No.: US 10,977,786 B2
(45) Date of Patent: Apr. 13, 2021

(54) WAFER OBSERVATION DEVICE

(71) Applicant: HITACHI HIGH-TECHNOLOGIES CORPORATION, Tokyo (JP)

(72) Inventors: Naoaki Kondo, Tokyo (JP); Minoru Harada, Tokyo (JP); Yuji Takagi, Tokyo (JP); Takehiro Hirai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 175 days.

(21) Appl. No.: 16/261,909

(22) Filed: Jan. 30, 2019

(65) Prior Publication Data
US 2019/0266713 A1 Aug. 29, 2019

(30) Foreign Application Priority Data
Feb. 26, 2018 (JP) .............................. JP2018-032142

(51) Int. Cl.
*G06K 9/00* (2006.01)
*G06T 7/00* (2017.01)
*G06K 9/62* (2006.01)

(52) U.S. Cl.
CPC ............ *G06T 7/001* (2013.01); *G06K 9/6202* (2013.01); *G06K 9/6215* (2013.01); *G06K 9/6218* (2013.01); *G06T 2207/30148* (2013.01); *G06T 2207/30204* (2013.01)

(58) Field of Classification Search
CPC . G06T 2207/30148; G06T 7/001; G06T 7/60; G06T 7/74; G06K 9/6203; G06K 9/3216; G06K 9/4604; G06K 9/6202; G06K 9/6215; G06K 9/685; G01N 21/9501
See application file for complete search history.

(56) References Cited

U.S. PATENT DOCUMENTS

| | | | | |
|---|---|---|---|---|
| 2004/0057621 A1* | 3/2004 | Lee | ...................... | G06K 9/6203 382/215 |
| 2006/0126916 A1* | 6/2006 | Kokumai | .............. | G03F 9/7076 382/151 |
| 2009/0087103 A1* | 4/2009 | Abe | ...................... | G06K 9/6203 382/209 |
| 2011/0110597 A1* | 5/2011 | Abe | ......................... | G06T 7/74 382/199 |
| 2012/0207397 A1* | 8/2012 | Nagatomo | ........... | G06K 9/6203 382/218 |
| 2013/0278748 A1* | 10/2013 | Nakayama | .............. | G06T 7/001 348/87 |
| 2014/0016854 A1* | 1/2014 | Nagatomo | .............. | G06T 7/001 382/149 |

FOREIGN PATENT DOCUMENTS

JP 2015-007587 A 1/2015

* cited by examiner

*Primary Examiner* — Li Liu
(74) *Attorney, Agent, or Firm* — Volpe Koenig

(57) ABSTRACT

A versatile template generation unit cuts a first region in which a similarity level to a template image is a first similarity level and a second region in which the similarity level to the template image is a second similarity level different from the first similarity level, from an input image including an alignment mark, to generate a versatile template image.

10 Claims, 18 Drawing Sheets

| MATCHING SCORE | LOCAL MAXIMUM POINT | DETECTED CHIP-REFERENCE-POINT COORDINATES | RANKING |
|---|---|---|---|
| 0.82 | (50, 250) | (100, 300) | 1 |
| 0.35 | (100, 200) | (150, 250) | 2 |
| 0.18 | (250, 250) | (300, 300) | 3 |

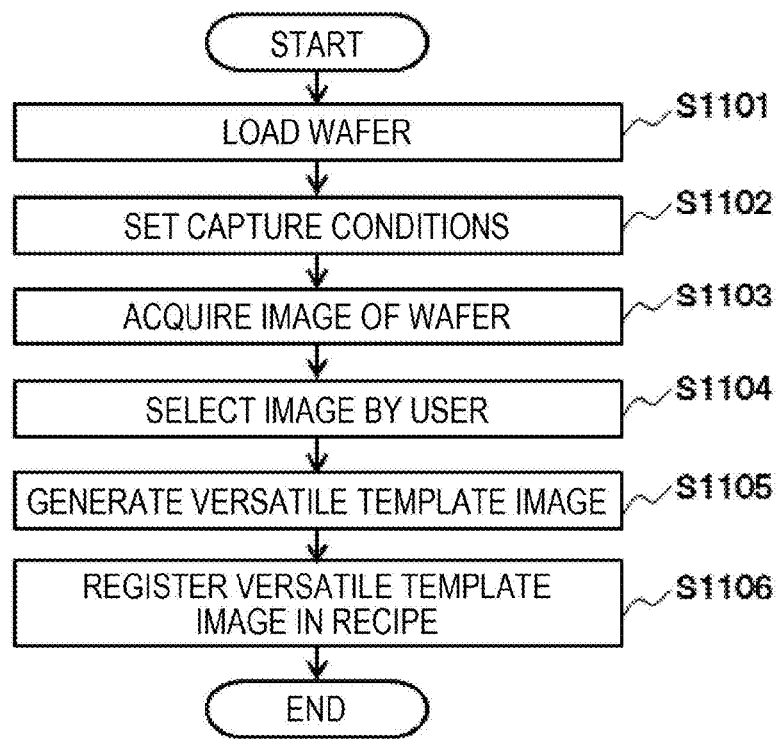
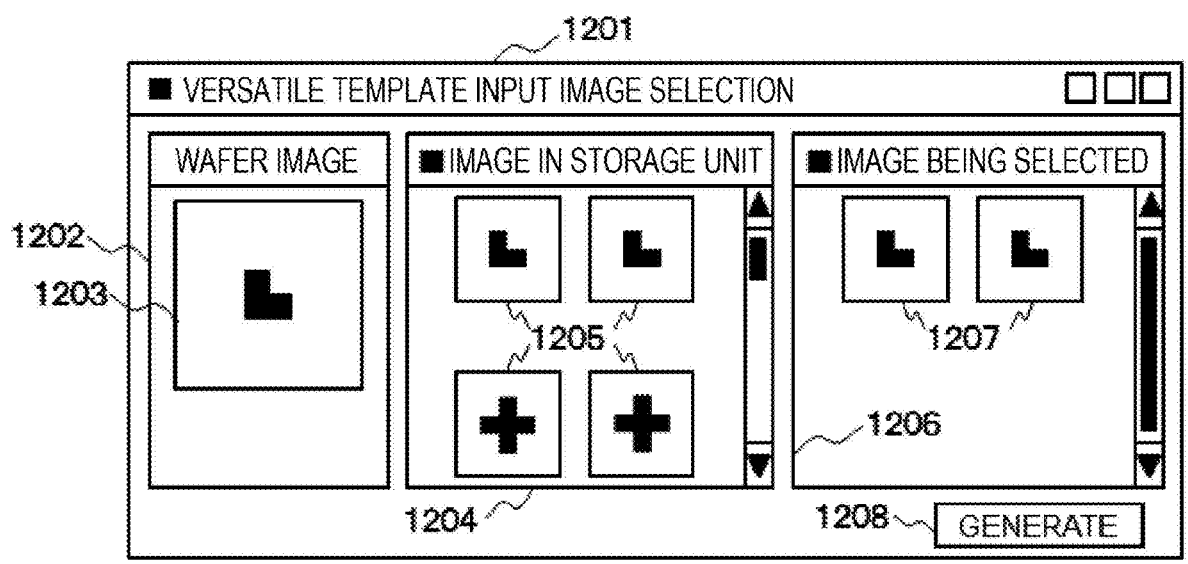

| IMAGE ID | TYPE | MANUFACTURING PROCESS | IMAGE WIDTH | IMAGE HEIGHT | UPPER-LEFT-END COORDINATES OF TEMPLATE REGION | LOWER-RIGHT-END COORDINATES OF TEMPLATE REGION | CHIP-REFERENCE-POINT COORDINATES |
|---|---|---|---|---|---|---|---|
| I1 | D1 | P1 | 500 | 500 | (100, 100) | (349, 349) | (250, 250) |
| I2 | D1 | P2 | 500 | 500 | (50, 50) | (299, 299) | (150, 150) |

| 1601 | 1602 | 1603 | 1604 | 1605 | 1606 | 1607 | 1608 |
|---|---|---|---|---|---|---|---|
| IMAGE ID | TYPE | MANUFACTURING PROCESS | IMAGE WIDTH | IMAGE HEIGHT | UPPER-LEFT-END COORDINATES OF COMMON REGION | LOWER-RIGHT-END COORDINATES OF COMMON REGION | CHIP-REFERENCE-POINT COORDINATES |
| I1 | D1 | P1 | 500 | 500 | (150, 150) | (349, 349) | (250, 250) |
| I2 | D1 | P2 | 500 | 500 | (50, 50) | (249, 249) | (150, 150) |

FIG. 17
| IMAGE ID 1701 | MATCHING SCORE 1702 | LOCAL MAXIMUM POINT 1703 | DETECTED CHIP-REFERENCE-POINT COORDINATES 1704 | IMAGE TO BE SUBJECTED TO MATCHING ID 1705 |
|---|---|---|---|---|
| p1 | 0.85 | (200, 200) | (250, 250) | I1 |
| p2 | 0.80 | (100, 100) | (150, 150) | I2 |
| n11 | 0.57 | (240, 160) | (290, 210) | I1 |
| n12 | 0.51 | (160, 240) | (210, 290) | I1 |
| n21 | 0.46 | (140, 140) | (190, 190) | I2 |
| n13 | 0.43 | (160, 160) | (210, 210) | I1 |
FIG. 18
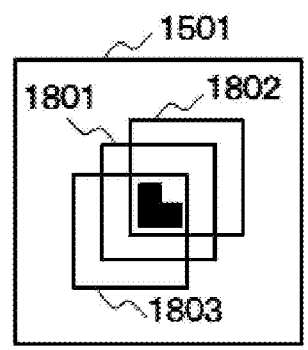
FIG. 19
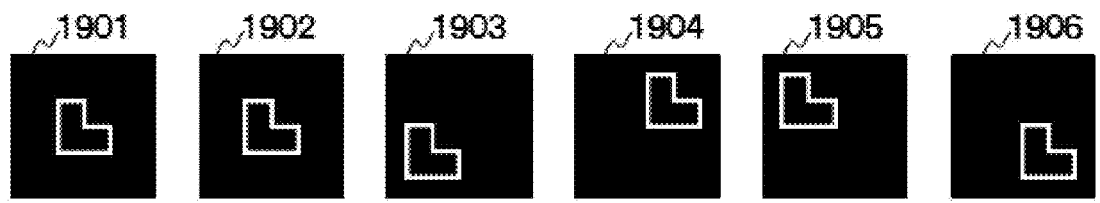

| VERSATILE TEMPLATE ID | IMAGE WIDTH | IMAGE HEIGHT | CHIP-REFERENCE-POINT COORDINATES | INPUT IMAGE ID |
|---|---|---|---|---|
| G2 | 200 | 200 | (100, 100) | I1, I2 |

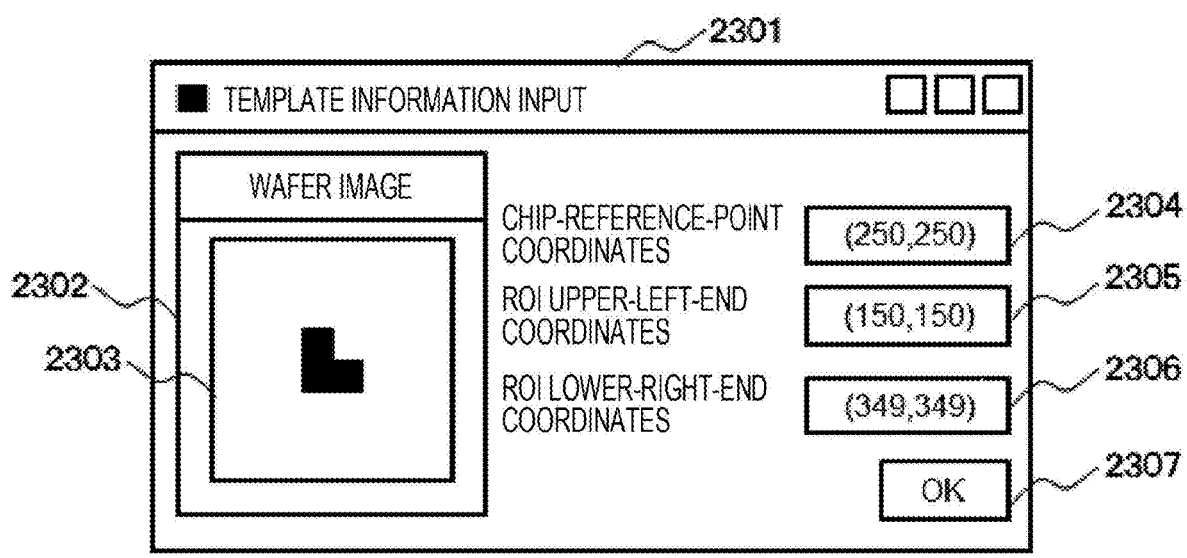

WAFER OBSERVATION DEVICE

BACKGROUND OF THE INVENTION

1. Field of the Invention

The present invention relates to a wafer observation device.

2. Description of the Related Art

A wafer observation device that examines or observes semiconductor wafers is used in order to improve the yield of semiconductor devices. Examples of the wafer observation device include a pattern measurement device that measures the dimensions of a pattern and a defect observation device that captures a defect part and outputs an image.

The wafer observation device conveys a wafer onto a stage and then acquires an alignment image of the periphery of a chip reference point that is a position to be a reference in a chip coordinate system. Then, an alignment mark that is a unique pattern having a known relative positional relationship to the chip reference point is automatically recognized to determine the chip reference point.

The wafer observation device determines chip reference points of a plurality of chips and calculates the rotation angle and the offset of the wafer to the stage, to perform correction (hereinafter, referred to as wafer alignment). Typically, a template matching method is used in order to recognize an alignment mark.

In the template matching method, a template image of an alignment mark portion is previously registered as a template in a recipe, and then an image to be subjected to matching of the periphery of a chip reference point of a wafer is acquired in wafer observation. Then, the template image is superimposed onto the acquired image while shifted, and the similarity level between the images is calculated. A location at which the similarity level is highest is specified to determine the chip reference point of the wafer.

As the template matching method, JP 2015-7587 A describes a method of creating an average image with image average processing, the method including performing alignment to each image between template-creation images.

SUMMARY OF THE INVENTION

The external appearance of an alignment mark varies depending on the manufacturing process or the type of a wafer. In JP 2015-7587 A, a viewpoint that the external appearance of an alignment mark varies depending on the manufacturing process or the type of a wafer has not been taken in account. Thus, in JP 2015-7587 A, a user needs to register a template image in a recipe every manufacturing process or type, resulting in a burden to the user.

An object of the present invention is to provide a wafer observation device in which a burden to a user is inhibited even in a case where the external appearance of an alignment mark varies depending on the manufacturing process or the type of a wafer.

A wafer observation device according to one aspect of the present invention, includes: a versatile template generation unit configured to generate a versatile template image with reference to a similarity level between an alignment image including an alignment mark to be used for alignment of a semiconductor wafer and a template image including the alignment mark, the similarity level being acquired from the alignment image scanned with the template image; a matching execution unit configured to perform matching between the versatile template image and the alignment image; and a matching success determination unit configured to determine whether the matching is successful, based on a result of the matching performed by the matching execution unit, in which the versatile template generation unit cuts, from an input image including the alignment mark, a first region in which the similarity level to the template image is a first similarity level and a second region in which the similarity level to the template image is a second similarity level different from the first similarity level, to generate the versatile template image.

According to the one aspect of the present invention, even in a case where the external appearance of an alignment mark varies depending on the manufacturing process or the type of a wafer, a burden to a user can be inhibited in the wafer observation device.

BRIEF DESCRIPTION OF THE DRAWINGS

FIG. 11 illustrates a processing flow of a method of creating a recipe for the process and the type of an object to be observed, according to the first embodiment;

FIG. 12 illustrates a screen on which a user selects an image to be used for generation of a versatile template image;

FIG. 17 illustrates a result of template matching between a versatile template image and input images;

FIG. 18 illustrates the relationship between an image at a local maximum point in a matching score map and an input image;

FIG. 19 illustrates images of locations having a high matching score with a versatile template image;

FIG. 23 illustrates an input screen for chip-reference-point information and ROI;

FIG. 24 illustrates accompanying information regarding a captured image after input of chip-reference-point information and ROI;

DESCRIPTION OF THE PREFERRED EMBODIMENTS

Embodiments will be described below with the drawings.

First Embodiment

A first embodiment relates to a method of creating a recipe for the process and the type of an object to be observed, a method of performing wafer alignment, and a method of observing a wafer. In particular, the first embodiment relates to a method of generating a versatile template image usable as a template image to wafer alignment for a plurality of processes and types, with at least one image selected by a user from at least one alignment image acquired in the past. The first embodiment enables commonality of a template image between a plurality of processes and types, so that the recipe-creation man-hour of the user can be reduced.

The configuration of a wafer observation device will be described with reference to FIG. 1.

Figure 1:
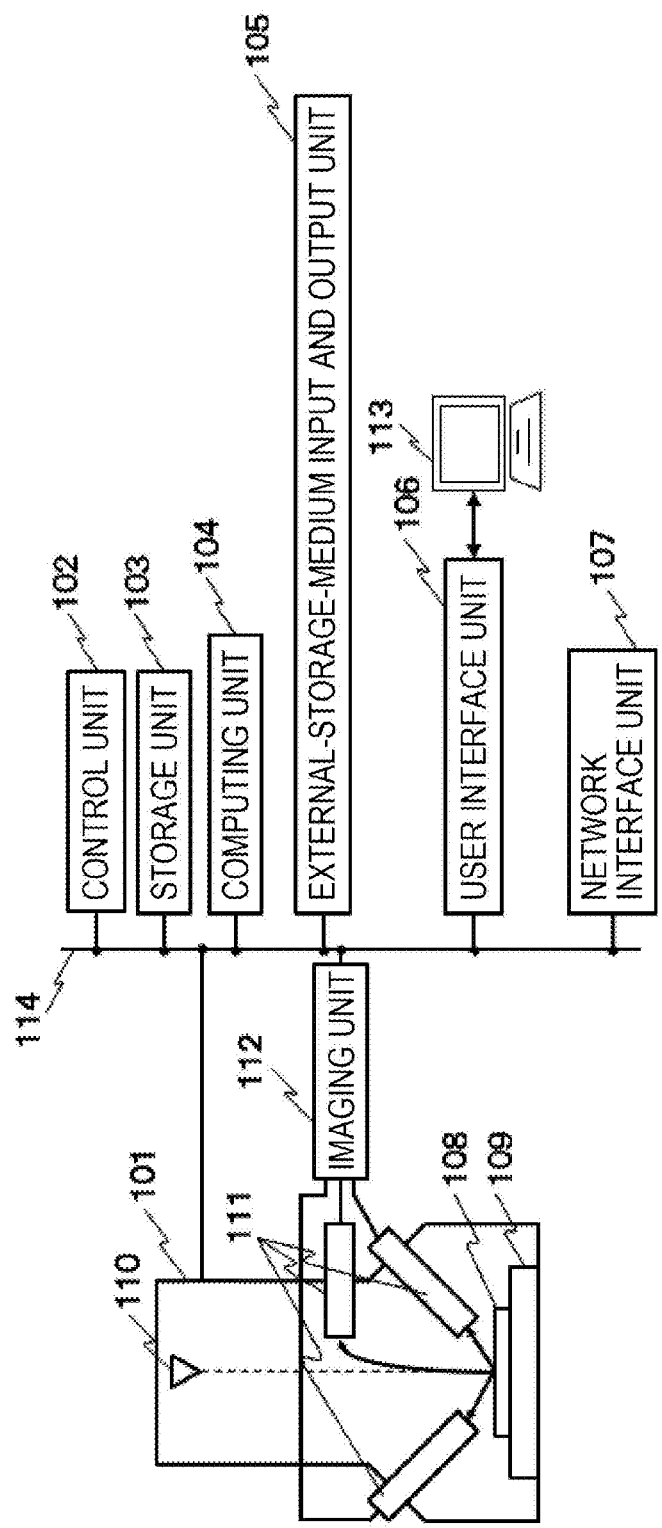
FIG. 1 is a diagram of the configuration of a wafer observation device.

As illustrated in FIG. 1, the wafer observation device includes: a scanning electron microscope (SEM) 101 that captures an image; a control unit 102 that controls the entirety; a storage unit 103 that stores information in a magnetic disk or a semiconductor memory; a computing unit 104 that performs computation in accordance with a program; an external-storage-medium input and output unit 105 that performs input and output of information to an external storage medium connected to the device; a user interface unit 106 that controls input and output of information to the user; and a network interface unit 107 that communicates with a different device through a network. An input and output terminal 113 including a keyboard, a mouse, and a display is connected to the user interface unit 106.

The SEM 101 includes: a movable stage 109 on which a sample wafer 108 is mounted; an electron source 110 that irradiates the sample wafer 108 with an electron beam; and a detector 111 that detects secondary electrons or reflected electrons generated from the sample wafer 108. Additionally, the SEM 101 includes: an electron lens that converges the electron beam on the sample (not illustrated); a deflector that causes the electron beam to scan on the sample wafer (not illustrated); and an imaging unit 112 that digitally converts a signal from the detector 111 to generate a digital image. Note that, because those are connected through a bus 114, information can be exchanged mutually.

The configuration of the control unit 102, the storage unit 103, and the computing unit 104 will be described with reference to FIG. 2.

The control unit 102 includes: a wafer conveyance control unit 201 that controls conveyance of a wafer; a stage control unit 202 that controls the stage; a beam shift control unit 203 that controls the irradiation position of the electron beam; a beam scan control unit 204 that controls the electron beam to scan; and an image acquisition unit 205.

The storage unit 103 includes: an alignment image storage unit 206 that stores an image to be used for wafer alignment and accompanying information (e.g., a type, a process, and chip-reference-point information); a recipe storage unit 207 that stores capture conditions (e.g., acceleration voltage, probe current, addition frame number, and capture visual-field size) and an image processing parameter; a versatile template image storage unit 208 that stores a versatile template image and accompanying information; a chip-reference-point information storage unit 209 that stores chip-reference-point information; and an observation image storage unit 210 that stores an image to be used for wafer observation.

The computing unit 104 includes: a versatile template generation unit 211 that outputs a versatile template image with input of at least one image stored in the alignment image storage unit 206; a matching execution unit 212 that performs template matching between the versatile template image and a wafer alignment image; and a matching success determination unit 213 that determines whether the matching is successful, on the basis of a matching score.

Note that the units 211 to 213 may include hardware designed to perform each computation, or may be implemented as software and may be executed with a versatile computing device (e.g., a CPU or a GPU).

A method of acquiring an image having specified coordinates with the image acquisition unit 205 will be described.

First, the wafer 108 to be measured is set on the stage 109 with a robot arm by the control of the wafer conveyance control unit 201. Next, the stage control unit 202 moves the stage 109 such that a capture visual field is included in a beam irradiation range.

At this time, the position of the stage is measured in order to absorb a movement error of the stage, and the beam shift control unit 203 adjusts a beam irradiation position such that the movement error is canceled. The beam scan control unit 204 causes the electron beam irradiated from the electron source 110, to scan in the capture visual field. The detector 111 detects the secondary electrons or the reflected electrons generated from the wafer due to the irradiation with the beam, and then the imaging unit 112 renders the detected secondary electrons or reflected electrons in digital imaging.

The captured image is stored together with the accompanying information, such as a type or a process, in the alignment image storage unit 206 or the observation image storage unit 210. The image of the wafer is stored in the alignment image storage unit 206 when wafer alignment is performed, and the image of the wafer is stored in the observation image storage unit 210 when the wafer is observed.

Figure 3:
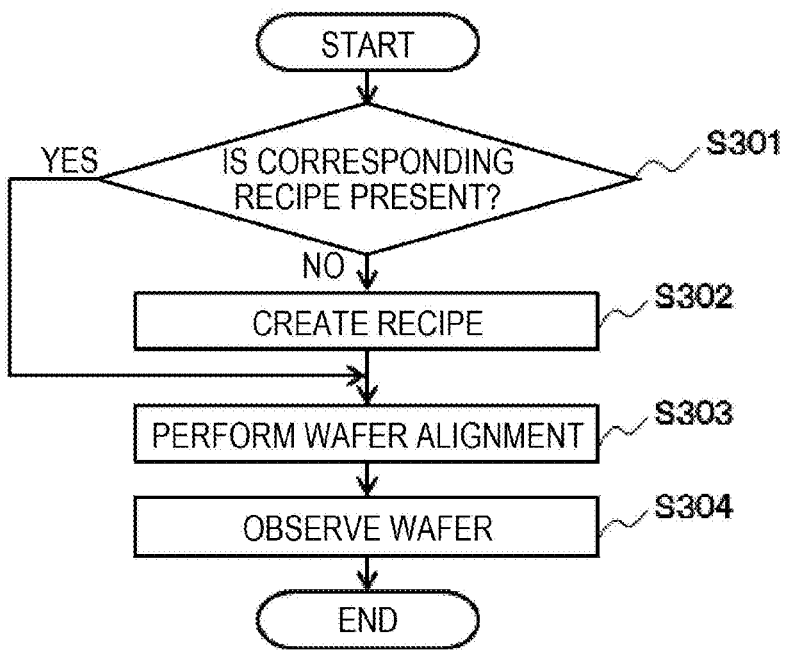
FIG. 3 illustrates a processing flow of a wafer observation method.

A method of observing a wafer will be described with reference to FIG. 3.

First, it is verified whether the recipe for the process and the type of an object to be observed is present in the recipe storage unit 207 (S301). In a case where the recipe for the process and the type of the object to be observed is present in the recipe storage unit 207, wafer alignment is performed with the recipe (S303), and the wafer is observed (S304). In a case where the recipe for the process and the type of the object to be observed is not present in the recipe storage unit 207, the recipe for the process and the type of the object to be observed is created (S302). Wafer alignment is performed with the created recipe (S303), and the wafer is observed (S304). The dimensions of a pattern are measured and a defect part is examined in the observation of the wafer (S304).

Here, for example, JP 2013-200319 A discloses a method of measuring the dimensions of a pattern. For example, JP 2001-325595 A discloses a method of examining a defect part.

Hereinafter, a method of creating a recipe and a method of performing wafer alignment with an already created recipe will be described. For convenience of description, the method of performing wafer alignment with an already created recipe will be described and then the method of creating a recipe will be described.

The wafer alignment method will be described with reference to FIG. 4.

First, a wafer is loaded on the stage (S401), and a recipe stored in the recipe storage unit 207 is read (S402). The recipe includes information regarding image capture conditions (e.g., acceleration voltage and probe current) and a template image to be used for alignment. Next, on the capture conditions stored in the recipe, an image of a region 502 of the periphery of a reference point of a chip 501 on the wafer 108 having the process and the type of the object to be observed is acquired with the image acquisition unit 205 (S403).

Figure 5:
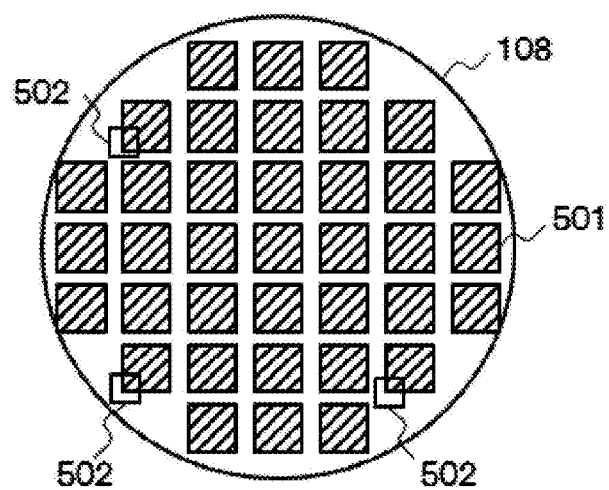
FIG. 5 illustrates chips and regions of the peripheries of chip reference points on a wafer.

FIG. 5 illustrates chips 501 on the wafer 108.

Figure 6:
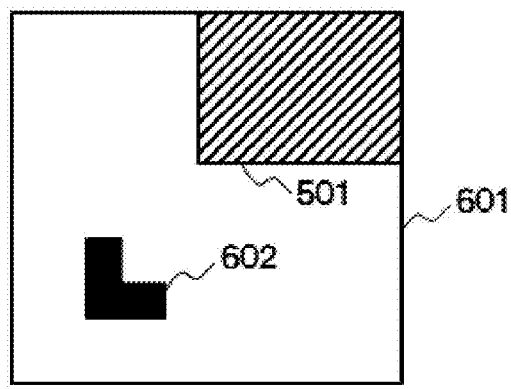
FIG. 6 illustrates an alignment image of the periphery of a chip reference point.

As illustrated in FIG. 5, the plurality of chips 501 is disposed on the wafer 108. FIG. 6 illustrates an exemplary alignment image acquired at S403. The example of FIG. 6 illustrates a unique pattern 602 having a known relative positional relationship to the reference point of the chip 501 in an image 601 (hereinafter, referred to as an alignment mark). Next, the matching execution unit 212 performs template matching between the alignment image acquired at S403 as an image to be subjected to matching and the template image stored in the recipe as a template image (S404), and the matching success determination unit 213 determines whether the template matching is successful (S405).

Figure 7:
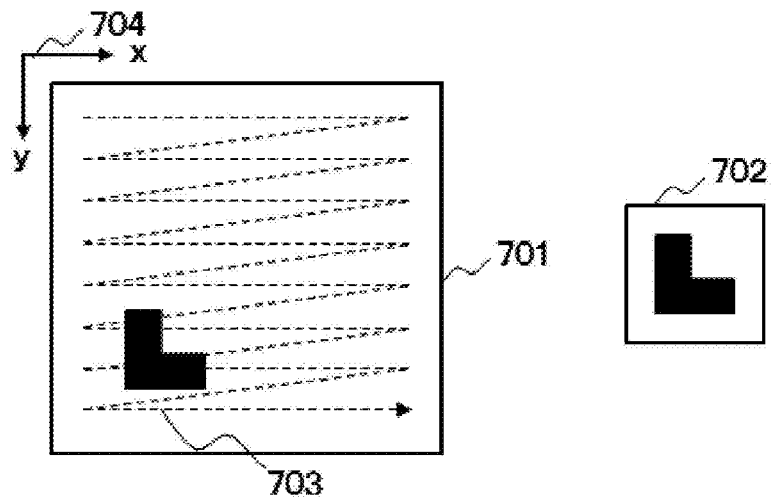
FIG. 7 is a schematic view of template matching.

A template matching method with the matching execution unit 212 will be described with reference to FIGS. 7 and 8.

In the template matching, a template image 702 is superimposed on an image to be subjected to matching 701 while shifted by raster scanning 703, and the similarity level between the images is calculated (matching score) to create a matching score map (S801).

The matching score map indicates the matching score in each pixel of the image to be subjected to matching. The calculation formula for the matching score map is expressed by Mathematical Formula 1. In Mathematical Formula 1, S represents the matching score map, x represents the x coordinate of the matching score map, y represents the y coordinate of the matching score map, f represents a function of calculating the matching score between the images, T represents the template image, I(x0, y0, w, h) represents an image partially cut out of the image to be subjected to matching, x0 represents the x coordinate of the upper left end of a region to be cut out, y0 represents the y coordinate of the upper left end of the region to be cut out, w represents the width of the region to be cut out, h represents the height of the region to be cut out, tw represents the width of the template image, and th represents the height of the template image. Here, an image coordinate system 704 has the origin at the upper left end of the image as illustrated in FIG. 7.

$$S(x,y)=f(T,I(x,y,tw,th))$$ [Mathematical Formula 1]

For example, a normalized cross-correlation value may be used as the matching score. The calculation formula for the normalized cross-correlation value is expressed by Mathematical Formula 2. In Mathematical Formula 2, U and V represent images, U' represents the average of brightness values in the image U, V' represents the average of brightness values in the image V, x represents the x coordinate of each image, and y represents the y coordinate of each image.

$$f(U,V) = \frac{\left(\sum_x \sum_y (U(x,y)-U')(V(x,y)-V')\right)}{\sqrt{\left(\sum_x \sum_y (U(x,y)-U')^2 \sum_x \sum_y (V(x,y)-V')^2\right)}}$$ [Mathematical Formula 2]

Figures 8, 9:
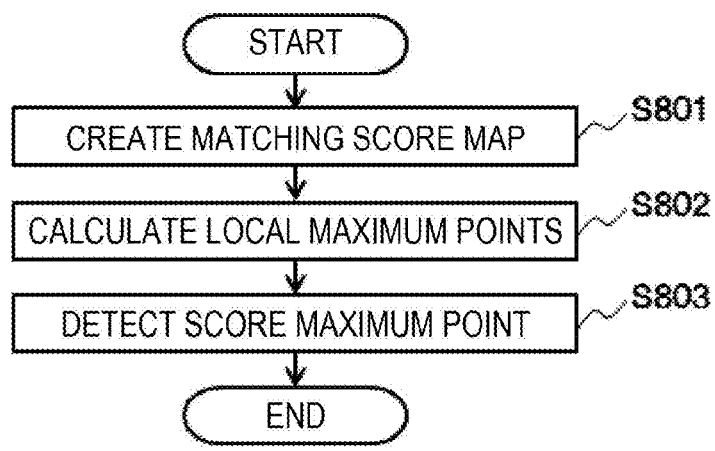
FIG. 8 illustrates a processing flow of the template matching.
FIG. 9 illustrates accompanying information regarding local maximum points in a matching score map calculated in the template matching.

Referring back to the description of FIG. 8. After the creation of the matching score map, locations having a local maximum point in the matching score map, namely, locations having a matching score higher than those in the neighborhood are calculated (S802). A location having the maximum matching score in the locations is detected as a location most similar to the template image (score maximum point) (S803).

FIG. 9 illustrates accompanying information regarding the local maximum points in the matching score map.

As illustrated in FIG. 9, matching score 901, local-maximum-point coordinates 902, detected chip-reference-point coordinates 903, and matching score ranking 904 are accompanied every local maximum point. The detected chip-reference-point coordinates 903 have the coordinates of the chip reference point in the template image added to the coordinates of the local maximum point.

In the example of FIG. 9, the detected chip-reference-point coordinates 903 is calculated with the coordinates (50, 50) of the chip reference point in the template image. Note that, in order to improve robustness against brightness contrast, preprocessing, such as edge extraction processing, may be applied to the captured image, and an image of an acquired processing result may be used in the template matching instead of the captured image itself.

A method of determining whether the template matching is successful, with the matching success determination unit 213 will be described.

As illustrated in FIG. 9, the extraction of the plurality of local maximum points from the matching score map, enables calculation of not only a first matching score that is the first place in ranking but also a second matching score that is the second place in ranking, to the one image to be subjected to matching. The matching success determination unit 213 determines that the template matching is successful, in a case where the first matching score is a threshold value or more, in a case where the ratio between the first matching score and the second matching score is a threshold value or more, or in a case where both of the conditions are satisfied.

Figure 4:
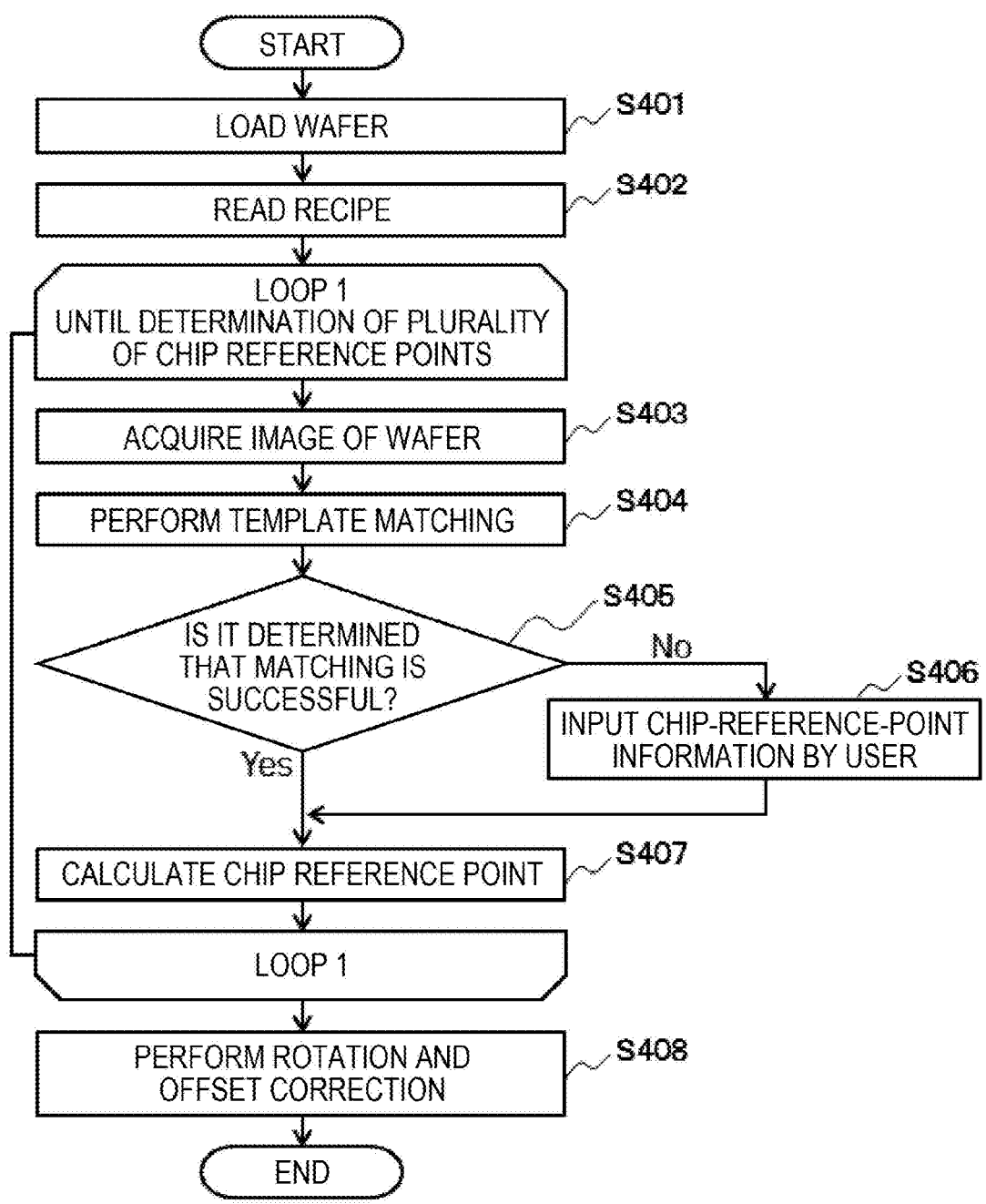
FIG. 4 illustrates a processing flow of a wafer alignment method.

Referring back to the description of FIG. 4. In a case where the matching success determination unit 213 determines that the matching is successful, the chip reference point of the wafer is calculated on the basis of the relative positional relationship between the alignment mark and the chip reference point. The chip reference point is stored in the chip-reference-point information storage unit 209 (S407). In a case where the matching success determination unit 213 determines that the matching is unsuccessful, the user inputs the coordinates of the chip reference point (S406), and the input chip-reference-point information is stored in the chip-reference-point information storage unit 209 (S407).

Figure 10:
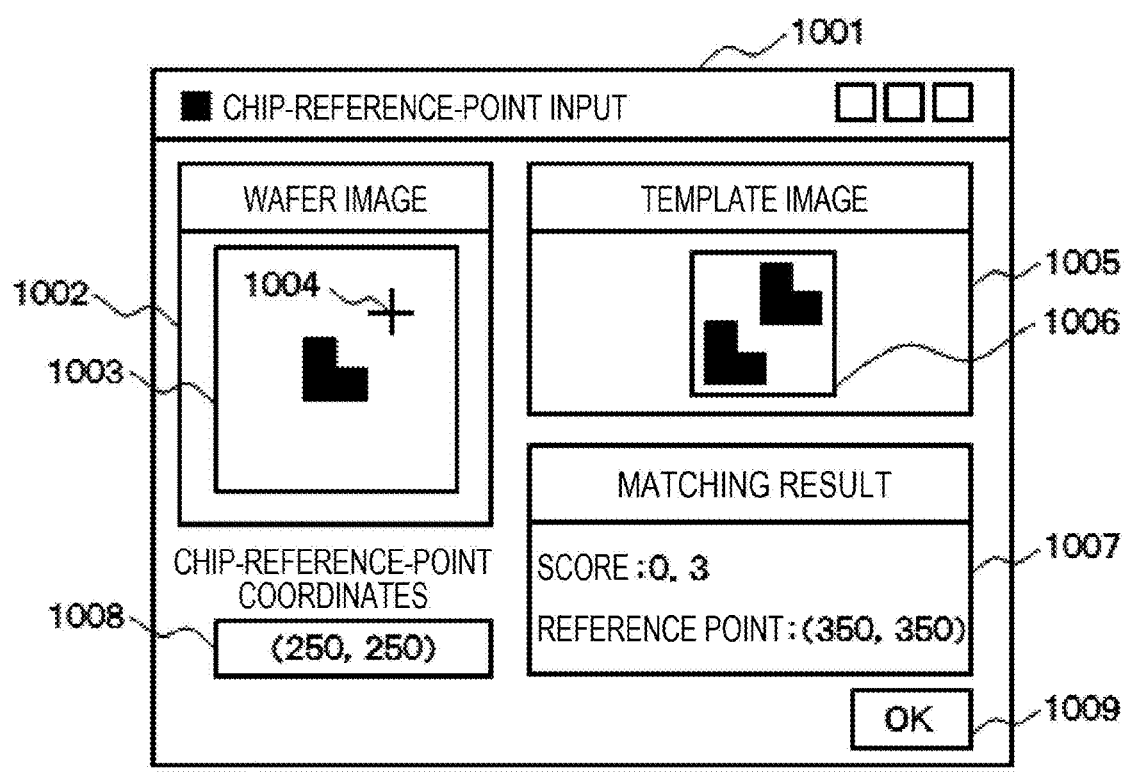
FIG. 10 illustrates an input screen for chip-reference-point information.

FIG. 10 exemplifies a screen 1001 of the input and output terminal 113 when the user inputs the coordinates of the chip reference point.

The screen 1001 includes an alignment image display portion 1002, a template image display portion 1005, a matching result display portion 1007, a chip-reference-point information input portion 1008, and an OK button 1009. In the alignment image display portion 1002, the alignment image acquired at S403 is displayed as an image including the alignment image reduced in size and rendered an icon (thumbnail image 1003).

A thumbnail image 1006 of the template image stored in the recipe is displayed in the template image display portion 1005. A result of the template matching to the alignment image is displayed in the matching result display portion 1007 (e.g., the matching score and the detected chip-reference-point coordinate information). Note that a cursor 1004 for the chip reference point detected by the template matching, may be display on the thumbnail image 1003 of the alignment image. The user inputs the coordinates of the chip reference point into the chip-reference-point coordinates input portion 1008 and clicks the OK button 1009, to finish the processing at S406.

The processing at S403 to S407 is repeated until the reference points of a plurality of chips are determined. After the determination of the reference points of the plurality of chips, the rotation and the offset of the wafer to the stage are calculated, and correction is performed (S408).

The wafer alignment method has been described above. Hereinafter, the method of creating a recipe for the process and the type of an object to be observed will be described with reference to FIG. 11.

First, a wafer having the process and the type of an object to be observed is loaded on the stage (S1101), and the user sets the image capture conditions (e.g., acceleration voltage and probe current) (S1102). Next, on the set capture conditions, an alignment image of the wafer having the process and the type of the object to be observed is acquired with the image acquisition unit 205 (S1103). After that, the user selects at least one image having a layout similar to that of the alignment mark of the alignment image acquired at S1103, from at least one image stored in the alignment image storage unit 206 (S1104).

FIG. 12 exemplifies a screen 1201 of the input and output terminal 113 when the user specifies an image.

As illustrated in FIG. 12, the screen 1201 includes a wafer image display portion 1202, an in-storage-unit image display portion 1204, a user-selected-image display portion 1206, and a GENERATE button 1208. A thumbnail image 1203 of the image acquired at S1103 is displayed in the wafer image display portion 1202. A thumbnail image 1205 of each image stored in the alignment image storage unit 206 is displayed in the in-storage-unit image display portion 1204. A thumbnail image 1207 of each image being selected by the user is displayed in the user-selected-image display portion 1206.

When the user presses the GENERATE button 1208, the versatile template generation unit 211 generates a versatile template image with input of the images selected by the user (S1105), and the generated versatile template image is stored in the recipe storage unit 207 and the versatile template image storage unit 208 (S1106).

Note that, in a case where the user already knows the layout of the alignment mark for the process and the type of the object to be observed, image selection may be performed without acquisition of an image of the wafer at S1103. Alternatively, an input image to the versatile template generation unit 211 may be an image of an acquired processing result with application of preprocessing, such as edge extraction processing, to the captured image.

A method of generating a versatile template image with the versatile template generation unit 211 will be described with reference to FIG. 13.

The versatile template generation unit 211 first superimposes all input images such that the chip reference points agree with each other (S1301), and calculates a common template region (S1302). Here, an example in which the user selects an image having an image ID of "I1" and an image having an image ID of "I2" will be given for the description.

Figures 13, 14:
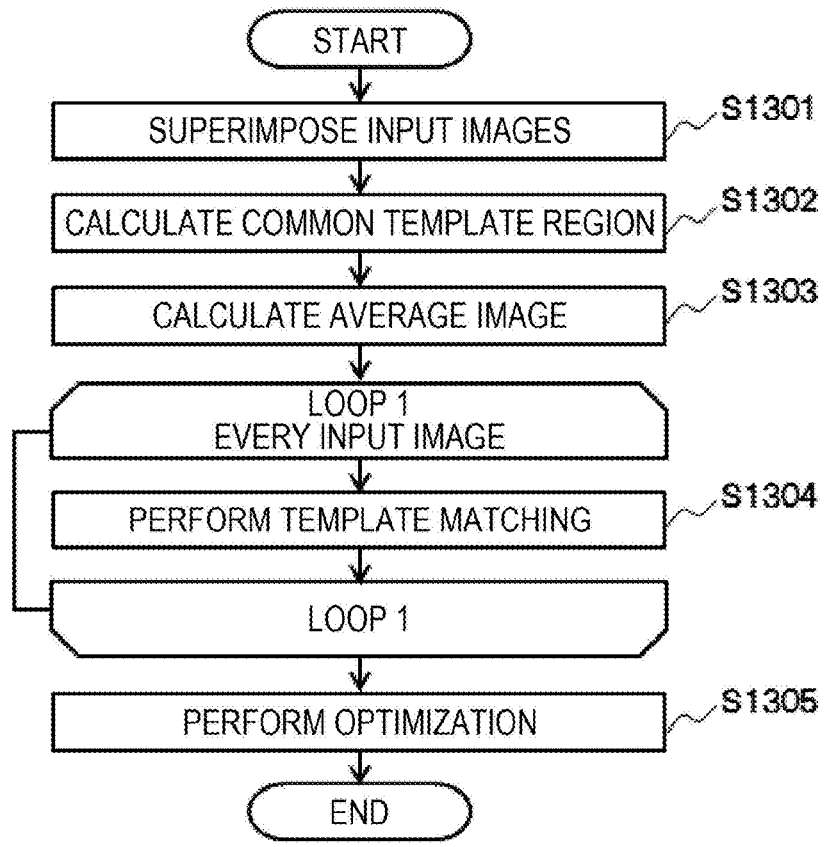
FIG. 13 illustrates a processing flow of a method of generating a versatile template image.
FIG. 14 illustrates accompanying information regarding a captured image.

FIG. 14 illustrates exemplary accompanying information regarding the image having the image ID of "I1" and the image having the image ID of "I2".

As illustrated in FIG. 14, image ID 1401, manufacturing type 1402, manufacturing process 1403, image width 1404, image height 1405, coordinate information regarding the upper left end of a template image region (ROI) 1406, coordinate information regarding the lower right end 1407, and chip-reference-point information 1408 are accompanied every image.

Image superimposition processing and common region calculation processing will be described with reference to FIG. 15.

An image 1501 and a region 1503 are the image having the image ID of "I1" and a template image region in the image, respectively. An image 1502 and a region 1504 are the image having the image ID of "I2" and a template image region in the image, respectively. Each image includes an alignment mark 1505 inside. At S1301, the image 1501 and the image 1502 are superimposed such that the chip reference points agree with each other (S1301), and a common template region including the overlap between the template regions of the input images is calculated (S1302). A region 1508 is the common template region of the image having the image ID of "I1" and a region 1509 is the common template region of the image having the image ID of "I2".

Figures 15, 16:
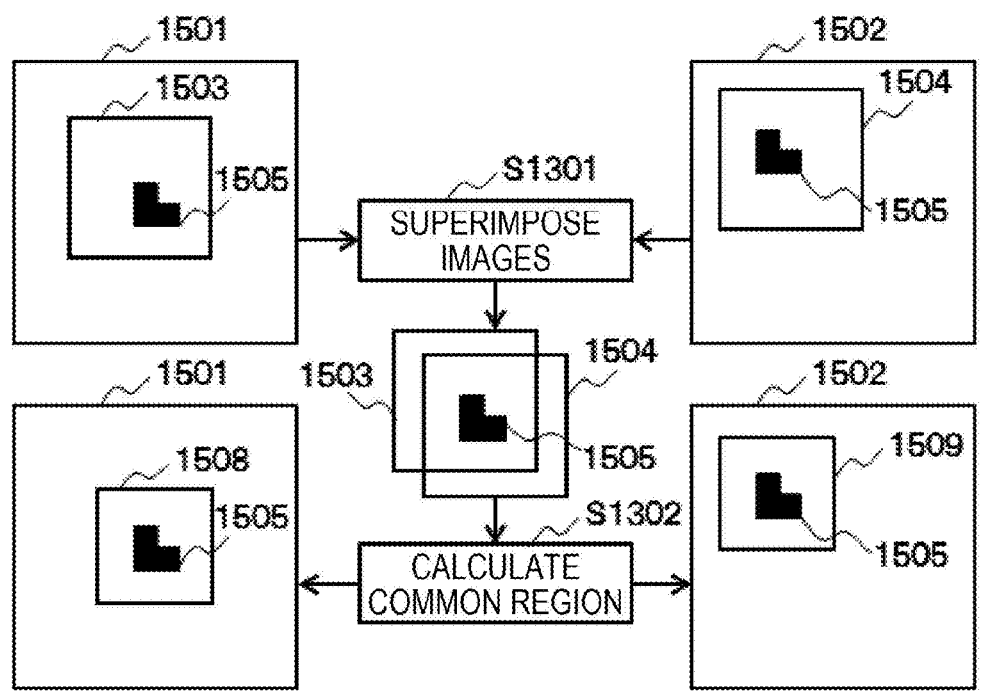
FIG. 15 illustrates a method of calculating a common template region between input images.
FIG. 16 illustrates a calculated result of the common template region.

FIG. 16 illustrates a calculated result of the common template region.

As illustrated in FIG. 16, image ID 1601, manufacturing type 1602, manufacturing processing 1603, image width 1604, image height 1605, coordinate information regarding the upper left end of the common template region 1606, coordinate information regarding the lower right end 1607, and chip-reference-point information 1608 are accompanied every image.

After the calculation of the common template region (S1302), an average image of the images of the common template regions of the input images is calculated as an initial value of the versatile template image (S1303). Every input image, the matching execution unit 212 performs template matching between the input image as the image to be subjected to matching and the versatile template image as the template image (S1304).

FIG. 17 illustrates a template matching result between the input images and the versatile template image.

In the example of FIG. 17, every local maximum point in the matching score map created in the template matching, image ID 1701 of the image corresponding to the local maximum point, matching score 1702, coordinates of the local maximum point 1703, detected chip-reference-point coordinates 1704, and image to be subjected to matching ID 1705 are accompanied. In a case where the detected chip-reference-point coordinates 1704 agree with the chip-reference-point coordinates 1608 of the image to be subjected to matching, the local maximum point and the periphery of the local maximum point are defined as an alignment mark part. In a case where the detected chip-reference-point coordinates 1704 disagree with the chip-reference-point coordinates 1608 of the image to be subjected to matching, the local maximum point and the periphery of the local maximum point are defined as the part that is not the alignment mark part.

The image corresponding to the local maximum point is an image having the same size as the versatile template image, cut out of the input image, the image having the coordinates of the local maximum point as the upper left end. An image of "pj" in the image ID 1701 is an image having the detected chip-reference-point coordinates 1704 agreeing with the chip-reference-point coordinates 1608 of the image to be subjected to matching (image in the alignment mark part). An image of "nji" in the image ID 1701 is an image having the detected chip-reference-point coordinates 1704 disagreeing with the chip-reference-point coordinates 1608 of the image to be subjected to matching (image in the part that is not the alignment mark part).

FIG. 18 illustrates the relationship between the image corresponding to a local maximum point of the matching score map and the input image.

As illustrated in FIG. 18, an image 1801 is an image of a region having a width of 200 and a height of 200 with coordinates (200, 200) as the upper left end, cut out of the image 1501 of "I1" in the image ID 1601. An image 1802 is an image of a region having a width of 200 and a height of 200 with coordinates (240, 160) as the upper left end, cut out of the image 1501 of "I1" in the image ID 1601. An image 1803 is an image of a region of having a width of 200 and a height of 200 with coordinates (160, 240) as the upper left end, cut out of the image 1501 of "I1" in the image ID 1601. The image 1801, the image 1802, and the image 1803 are an image of "p1", an image of "n11", and an image of "n12", respectively, in the image ID 1701 of FIG. 17 (an image of "n13" in the image ID 1701 is not illustrated).

After the template matching every input image (S1304), optimization is performed as expressed in Mathematical Formula 3, so that a versatile template image is generated (S1305). In Mathematical Formula 3, r represents the versatile template image, r' represents a parameter to be varied in the optimization, pj represents the image in the alignment mark part in an input image Ij, M represents the number of input images, nji represents the image in the part that is not the alignment mark part in the input image Ij, Nj represents the number of images in the part that is not the alignment mark part in the input image Ij, and f represents a function of calculating the matching score between the images that is an argument. As described above, for example, the normalized cross-correlation value expressed by Mathematical Formula 2 may be used.

$$r = \underset{r'}{\operatorname{argmax}}\left\{\sum_{j=1}^{M}\left\{f(r', pj) - \frac{1}{Nj}\sum_{i=1}^{Nj}f(r', nji)\right\}\right\} \quad \text{[Mathematical Formula 3]}$$

FIG. 19 illustrates exemplary images each corresponding to a local maximum point in the matching score map to the input image. An image 1901, an image 1902, an image 1903, an image 1904, an image 1905, and an image 1906 have "p1", "p2", "n11", "n12", "n21", and "n13", respectively, in the image ID 1701 in FIG. 17. Note that the images 1901 to 1906 result from application of edge extraction processing. The versatile template image generated at S1105 includes a mark different from the alignment mark of each input image, distinctively. The feature of the versatile template image will be described with FIG. 20.

Figures 20, 21:
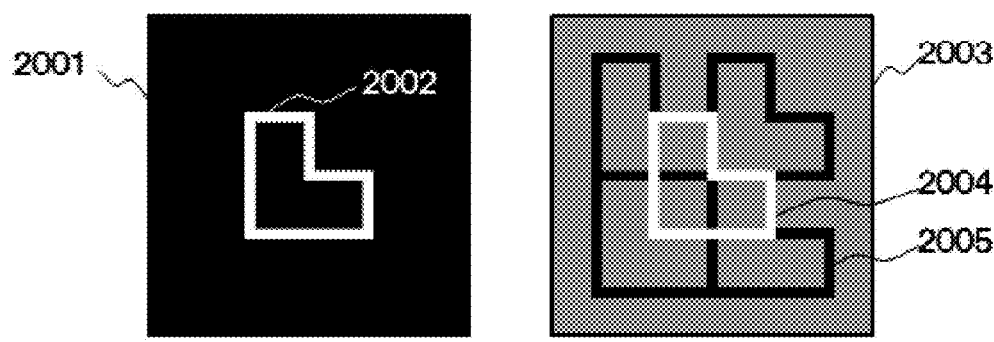
FIG. 20 illustrates a versatile template image generated in a case where the layout of an alignment mark of an input image has an L shape.
FIG. 21 illustrates accompanying information regarding the versatile template image.

FIG. 20 exemplifies a versatile template image 2003 generated in a case where the layout of an alignment mark 2002 of an input image 2001 has an L shape.

As illustrated in FIG. 20, considering an input image and a versatile template image each as an image normalized such that the average of brightness values is zero, the versatile template image 2003 distinctively includes: a second L-shaped pattern 2004 having a brightness value identical in positive and negative to that of a first L-shaped pattern in the input image 2001; and third L-shaped patterns 2005 having a brightness value inverse in positive and negative to that of the first L-shaped pattern, at upper left, lower left, upper right, and lower right positions to the second L-shaped pattern 2004.

The versatile template image 2003 includes a mark including the second L-shaped pattern 2004 and the third L-shaped patterns 2005. The mark is different from the alignment mark 2002 of the input image 2001.

FIG. 21 illustrates exemplary accompanying information regarding the versatile template image.

As illustrated in FIG. 21, every versatile template image, versatile template image ID 2101, image width 2102, image height 2103, chip-reference-point coordinates in the versatile template image 2104, and input image used in generation of the versatile template image ID 2105 are accompanied.

As described above, according to the first embodiment, a versatile template image usable as a template image to wafer alignment for a plurality of processes and types, can be generated with at least one image selected by the user. The first embodiment enables commonality of the template image between the plurality of processes and types, so that the recipe-creation man-hour of the user can be reduced.

Second Embodiment

Next, a wafer observation device according to a second embodiment will be described.

The device that creates a recipe for the process and the type of an object to be observed with a method different from that in the first embodiment will be described. Device configurations according to the second embodiment are similar to those illustrated in FIGS. 1 and 2 in the first embodiment. A different point is a method of creating a recipe for the process and the type of an object to be observed. Different parts from the first embodiment will be only described below.

The method of generating a versatile template image with an image selected by the user has been described in the first embodiment. In the second embodiment, a method of generating a versatile template image without selection of an image to be used for generation of a versatile template image by a user will be described. The second embodiment enables commonality of a template image between a plurality of processes and types, so that the recipe-creation man-hour of the user can be reduced, similarly to the first embodiment.

Figure 22:
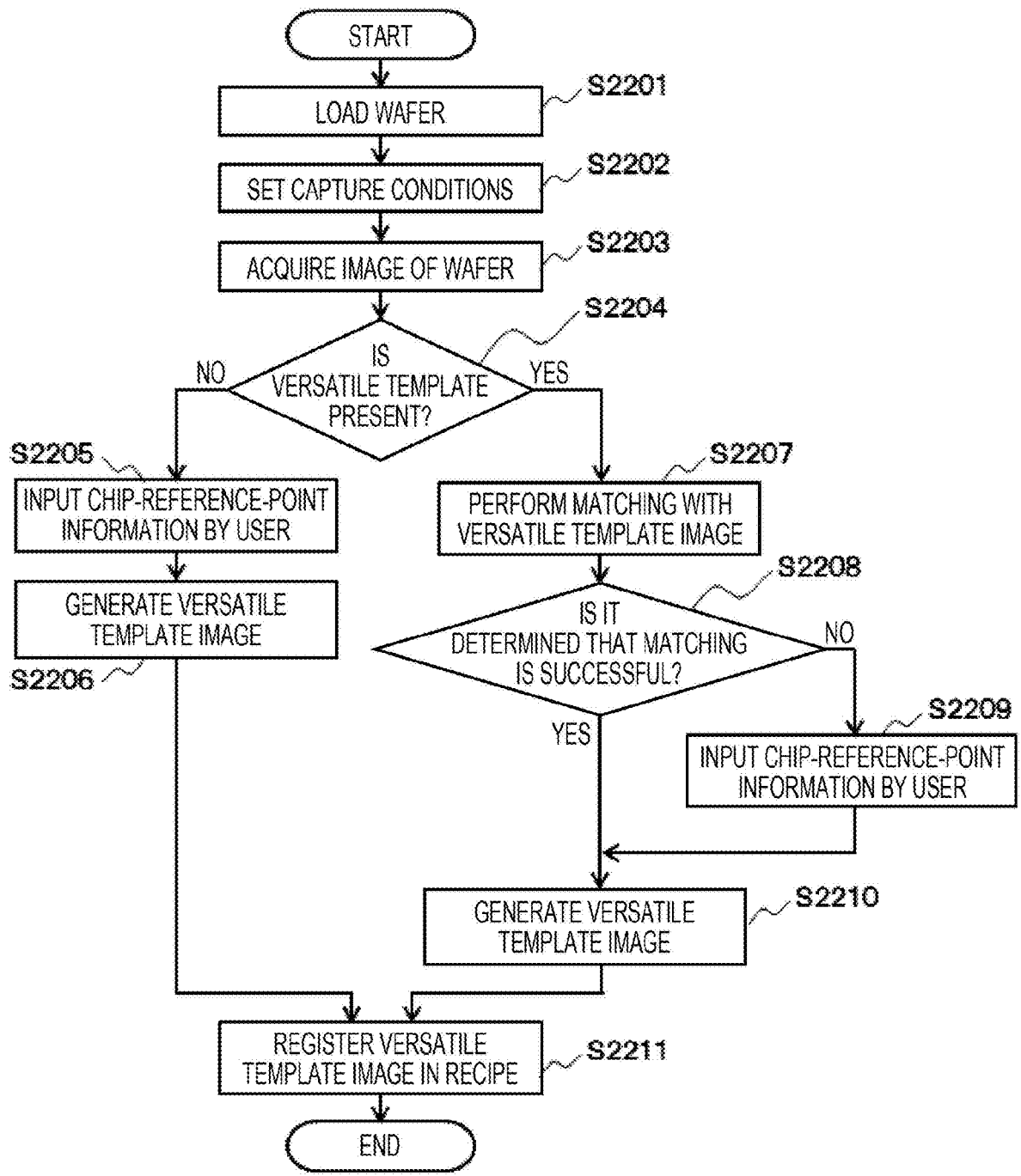
FIG. 22 illustrates a processing flow of a method of creating a recipe for the process and the type of an object to be observed, according to the second embodiment.

A method of creating a recipe will be described with reference to FIG. 22.

First, a wafer having the process and the type of an object to be observed is loaded on a stage (S2201), and the user sets image capture conditions (e.g., acceleration voltage and probe current) (S2202). Next, on the set image capture conditions, an alignment image of the wafer having the process and the type of the object to be observed is acquired with an image acquisition unit 205 (S2203). Then, it is verified whether a versatile template image is present in a versatile template image storage unit 208 (S2204).

In a case where it is determined that the versatile template image is not present in the versatile template image storage unit 208, the alignment image acquired at S2203 is displayed on an input and output terminal 113, and the user inputs chip-reference-point information and a template image region (ROI) (S2205). The image acquired at S2203 is stored together with accompanying information, such as the chip-reference-point information and the ROI input by the user, in an alignment image storage unit 206.

FIG. 23 exemplifies a screen 2301 of the input and output terminal 113 when the chip-reference-point information and the ROI are input.

As illustrated in FIG. 23, the screen 2301 includes an alignment image display portion 2302, a chip-reference-point information input portion 2304, an ROI upper-left-end coordinate information input portion 2305, an ROI lower-right-end coordinate information input portion 2306, and an OK button 2307. A thumbnail image 2303 of the alignment image of the wafer is displayed in the alignment image display portion 2302. The user inputs the information regarding the coordinates of the chip reference point and the ROI, and then clicks the OK button 2307.

FIG. 24 illustrates exemplary accompanying information regarding an image of "I3" in image ID 2401 after input of the coordinates of the chip reference point and the ROI.

As illustrated in FIG. 24, image ID 2401, manufacturing type 2402, manufacturing process 2403, image width 2404, image height 2405, ROI upper-left-end coordinate information 2406, ROI lower-right-end coordinate information 2407, and chip-reference-point information 2408 are accompanied every image.

Referring back to FIG. 22, the description will be continued. After the input of the coordinate information and the ROI by the user, the captured image is input into a versatile template generation unit 211. The versatile template generation unit 211 generates a versatile template image (S2206), and the generated versatile template image is stored in a recipe storage unit 207 and the versatile template image storage unit 208 (S2211).

In a case where it is determined at S2204 that the versatile template image is present in the versatile template image storage unit 208, a matching execution unit 212 performs template matching between the alignment image acquired at S2203 as an image to be subjected to matching and a first versatile template image stored in the versatile template image storage unit 208 as a template image (S2207), and a matching success determination unit 213 determines whether the template matching is successful (S2208).

In a case where the matching success determination unit 213 determines that the matching is successful, the chip reference point and the template image region are determined with a result of the template matching. In a case where the matching success determination unit 213 determines that the matching is unsuccessful, the user inputs the chip-reference-point information and the template image region (S2209).

After that, regardless of whether the matching is successful, the versatile template generation unit 211 generates a second versatile template image with input of the image acquired at S2203 and the image used in generation of the first versatile template image (S2210). The generated second versatile template image is stored in the recipe storage unit 207 and the versatile template image storage unit 208 (S2211).

Note that, in the case where the matching success determination unit 213 determines that the matching is successful, the first versatile template image may be stored in the recipe storage unit 207 and the versatile template image storage unit 208 without the versatile-template-image generation processing (S2210). An image of an acquired processing result with application of preprocessing, such as edge extraction processing, to the captured image, may be used for the image to be subjected to matching or the input image of the versatile template generation unit 211 in the template matching.

As described above, the second embodiment enables generation of a versatile template image without specification of an image to be used for generation of a versatile template image, by the user. The second embodiment enables commonality of a template image between a plurality of processes and types, so that the recipe-creation man-hour of the user can be reduced, similarly to the first embodiment.

Third Embodiment

Next, a wafer observation device according to a third embodiment will be described.

The device that creates a recipe for the process and the type of an object to be observed and performs wafer alignment with a method different from those in the first and second embodiments will be described. Device configurations according to the third embodiment are similar to those illustrated in FIGS. 1 and 2 in the first embodiment, except for a computing unit. Different points are the device configuration of the computing unit, a method of creating a recipe, and a template matching method in wafer alignment. Different parts from the first and second embodiments will be only described below.

The layout of an alignment mark of a semiconductor wafer varies depending on a manufacturing process or a type in some cases. For example, a cross-shaped layout is present in addition to an L-shaped layout as illustrated in FIG. 6. When an image having a different layout is input into the versatile template generation unit 211, it is difficult to generate a versatile template image applicable as a template image for a plurality of processes or types.

The third embodiment relates to a method of generating, with previously clustering to images, a versatile template image from an image of an alignment mark having a similar layout. This arrangement enables generation of a versatile template image applicable to a plurality of processes or types even when images of alignment marks having different layouts are stored in the alignment image storage unit 206.

Figure 25:
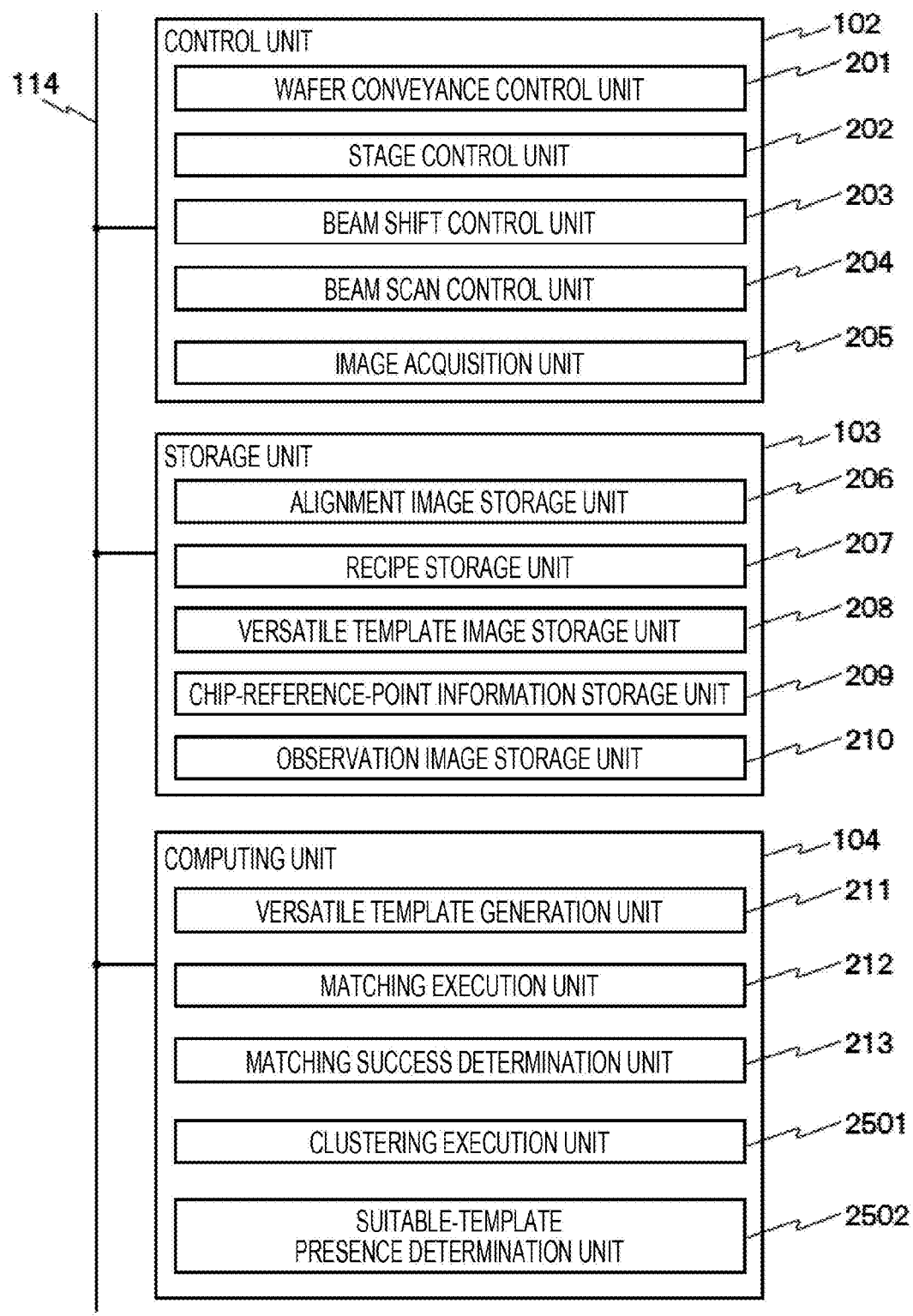
FIG. 25 is a diagram of the configuration of a control unit, a storage unit, and a computing unit of a wafer observation device according to a third embodiment.

A specific device configuration will be described with reference to FIG. 25.

Figure 2:
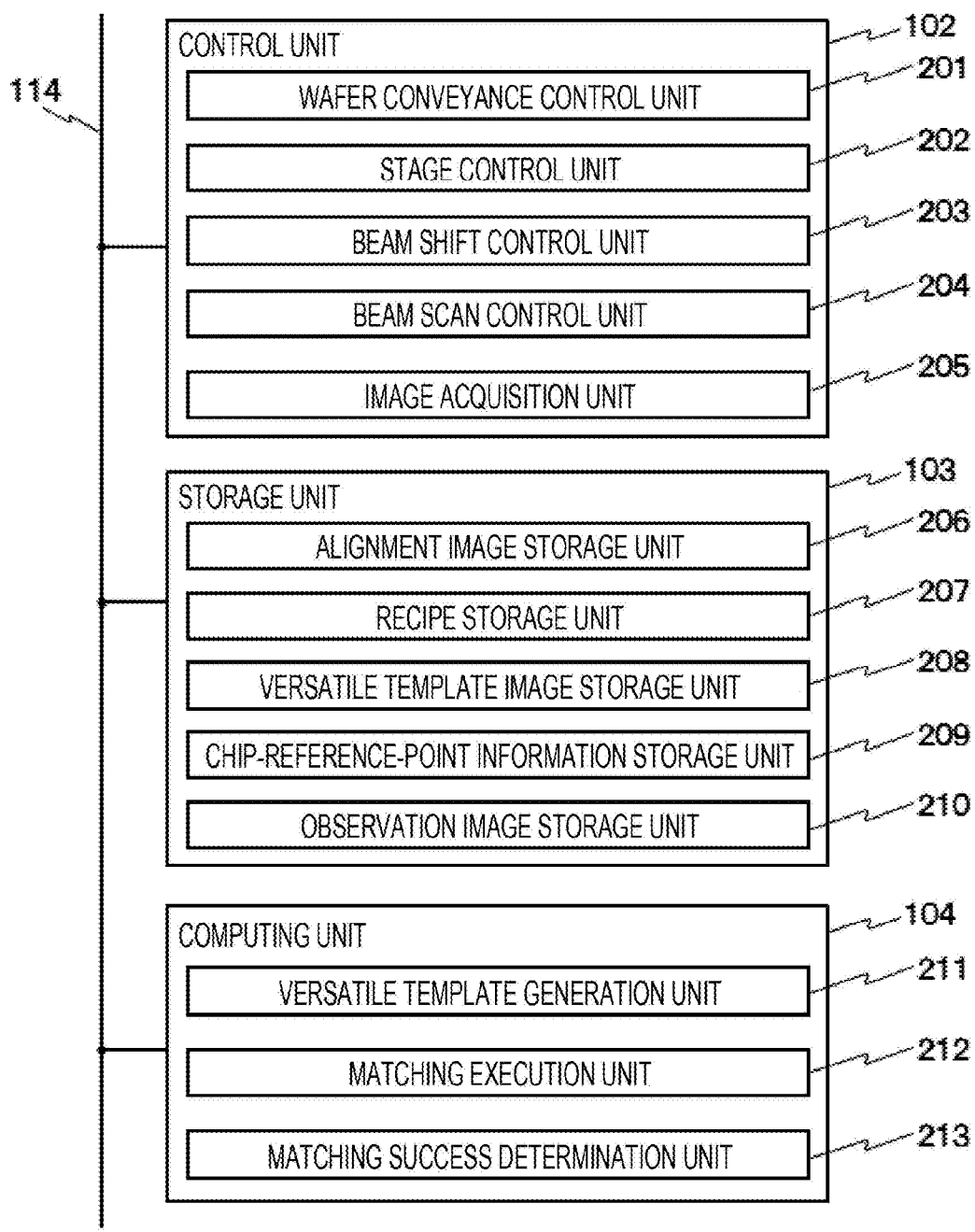
FIG. 2 is a diagram of the configuration of a control unit, a storage unit, and a computing unit of the wafer observation device according to first and second embodiments.

A control unit 102 and a storage unit 103 are similar to those in FIG. 2, and thus the descriptions thereof will be omitted. A computing unit 104 includes: a versatile template generation unit 211 that outputs a versatile template image with input of at least one alignment image stored in an alignment image storage unit 206; a matching execution unit 212 that performs template matching between the versatile template image and a wafer alignment image; a matching success determination unit 213 that determines whether the matching is successful, on the basis of a matching score; a clustering execution unit 2501 that performs clustering to a plurality of alignment images; and a suitable-template presence determination unit 2502 that determines whether a versatile template image suitable to the process and the type of an object to be observed is present in a versatile template image storage unit 208.

Note that the units 211 to 213, 2501, and 2502 may include hardware designed to perform each computation, or may be implemented as software and may be executed with a versatile computing device (e.g., a CPU or a GPU).

A method of creating a recipe for the process and the type of an object to be observed will be described with reference to FIG. 26.

First, the clustering execution unit 2501 performs clustering to a plurality of alignment images stored in the alignment image storage unit 206, on the basis of matching scores between the images (S2601), to acquire clusters each including images of alignment marks having similar layouts.

Next, every cluster, at least one image included in the cluster is input into the versatile template generation unit 211. A versatile template image is generated and is stored in the versatile template image storage unit 208 (S2602).

Figure 27:
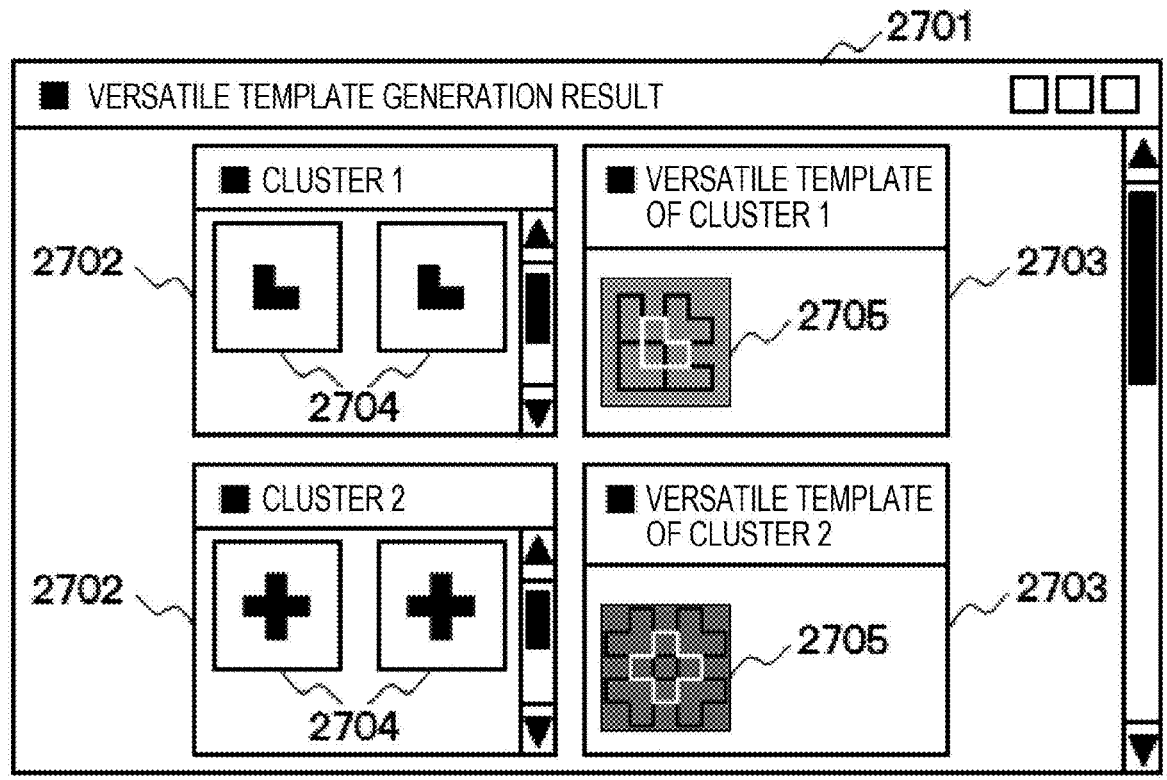
FIG. 27 illustrates a screen displaying a result of generation of a versatile template image every cluster.

FIG. 27 illustrates an exemplary screen when a result of generation of a versatile template image every cluster is displayed on an input and output terminal 113.

As illustrated in FIG. 27, a screen 2701 includes in-cluster image display portions 2702 and versatile template image display portions 2703. Each in-cluster image display portion 2702 has thumbnail images 2704 displayed for the cluster. Each versatile template image display portion 2703 has a versatile template image 2705 displayed for the cluster.

In the example of FIG. 27, a cluster 1 includes the images in which the layout of the alignment mark has an L-shaped pattern, and a cluster 2 includes the images in which the layout has a cross-shaped pattern. The feature of the versatile template image generated in a case where the layout of the alignment mark has an L-shaped shape has been described in FIG. 20 in the first embodiment. Here, the feature of the versatile template image generated in a case where the layout of the alignment mark of an input image has a cross shape will be described with FIG. 28.

Figure 28:
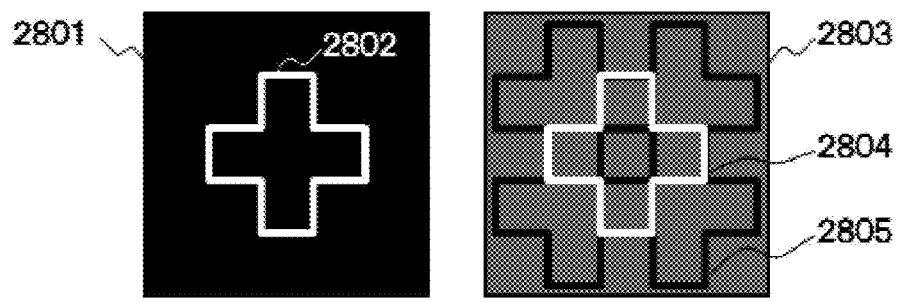
FIG. 28 illustrates a versatile template image generated in a case where the layout of an alignment mark of an input image has a cross shape.

FIG. 28 exemplifies a versatile template image 2803 generated by the versatile template generation unit in a case where the layout of an alignment mark 2802 of an input image 2801 has a cross shape.

Considering an input image and a versatile template image each as an image normalized such that the average of brightness values is zero, the versatile template image 2803 includes: a second cross-shaped pattern 2804 having a brightness value identical in positive and negative to that of a first cross-shaped pattern in the input image; and third cross-shaped patterns 2805 having a brightness value inverse in positive and negative to that of the first cross-shaped pattern, at upper left, lower left, upper right, and lower right positions to the second cross-shaped pattern 2804.

The versatile template image 2803 includes a mark including the second cross-shaped pattern 2804 and the third cross-shaped patterns 2805. The mark is different from the alignment mark 2802 of the input image 2801.

Figure 26:
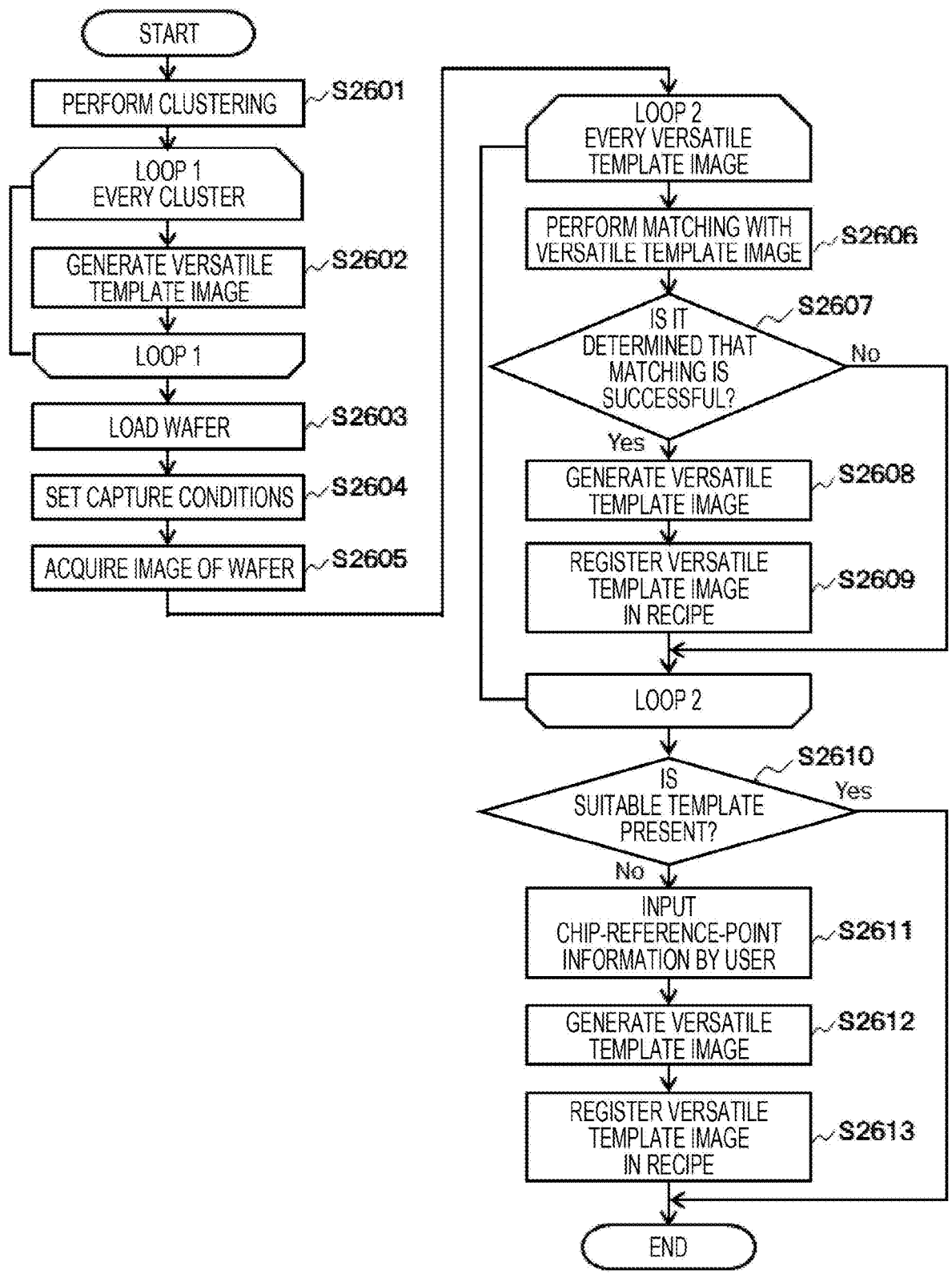
FIG. 26 illustrates a processing flow of a method of creating a recipe for the process and the type of an object to be observed, according to the third embodiment.

Referring back to the description of FIG. 26. After the generation and the storage of the versatile template image every cluster, a wafer having the process and the type of an object to be observed is loaded on a stage (S2603). A user sets image capture conditions (e.g., acceleration voltage and probe current) (S2604). Next, on the set image capture conditions, an alignment image of the wafer having the process and the type of the object to be observed is acquired with an image acquisition unit 205 (S2605). For at least one first versatile template image stored in the versatile template image storage unit 208, the matching execution unit 212 performs template matching between the first versatile template image as a template image and the image acquired at S2605 as an image to be subjected to matching (S2606). The matching success determination unit 213 determines whether the matching is successful (S2607).

In a case where it is determined that the matching is successful, the versatile template generation unit 211 generates a second versatile template image with input of the image acquired at S2605 and the image used in generation of the first versatile template image (S2608). The generated second versatile template image is stored in a recipe storage unit 207 and the versatile template image storage unit 208 (S2609).

After that, the suitable-template presence determination unit 2502 determines whether a first versatile template image suitable to the process and the type of the object to be observed is present in the versatile template image storage unit 208 (S2610). In a case where it is determined at S2607 that the matching is successful with the at least one first versatile template image, the suitable-template presence determination unit 2502 determines that the first versatile template image suitable to the process and the type of the object to be observed is present. In a case where the matching is unsuccessful with all versatile template images stored in the versatile template image storage unit 208, it is determined that no versatile template image suitable to the process and the type of the object to be observed is present.

In a case where the suitable-template presence determination unit 2502 determines that no template image suitable to the process and the type of the object to be observed is present, the user inputs chip-reference-point information and a template image region (S2611). The alignment image acquired at S2605 is input into the versatile template generation unit 211, and the versatile template generation unit 211 generates a versatile template image (S2612). The generated versatile template image is stored in the recipe storage unit 207 and the versatile template image storage unit 208 (S2613). Note that, in the case where the matching success determination unit 213 determines that the matching is successful, the first versatile template image may be stored in the recipe storage unit 207 and the versatile template image storage unit 208 without the versatile-template-image generation processing (S2608).

The clustering processing S2601 and the versatile-template-image generation processing for each cluster S2602 may be performed before a recipe is created. An image of an acquired processing result with application of preprocessing, such as edge extraction processing, to the captured image, may be used for the image to be subjected to matching or the input image of the versatile template generation unit in the template matching.

In a case where the number of first versatile template images determined as successful matching by the matching success determination unit 213 is zero or one, a wafer alignment method is similar to the method described in the first embodiment. A wafer alignment method will be described in a case where the number of first versatile template images determined as successful matching by the matching success determination unit 213 is at least two.

Figure 29:
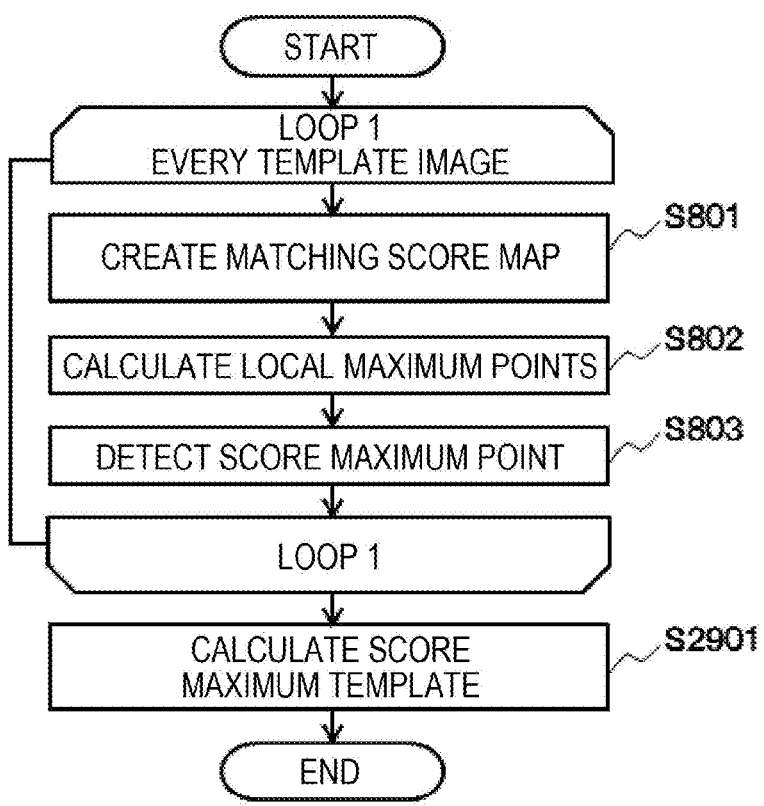
FIG. 29 illustrates a processing flow of template matching according to the third embodiment.

The wafer alignment method is different from that in the first embodiment in terms of the processing at S404 and S405 of FIG. 4. The processing at S404 will be described with reference to FIG. 29.

The processing at S801 to S803 is performed for each of the versatile template images stored in the recipes. Specifically, a matching score map is created with the alignment image acquired at S403 as an image to be subjected to matching (S801). Locations each being a local maximum point in the matching score map are calculated (S802). A location having the maximum matching score in the locations is detected as a location most similar to the template image (score maximum point) (S803).

After that, comparison is made between the matching scores at the score maximum points detected for the template images. A template image having the maximum matching score is calculated, and a result of matching with the template image is output (S2901). In the matching success determination processing S405, it is determined whether the matching is successful, on the basis of the output result at S404.

As described in the first embodiment, the extraction of a plurality of local maximum points from the matching score map, enables calculation of not only a first matching score that is the first place in ranking but also a second matching score that is the second place in ranking, to the one image to be subjected to matching. In the matching success determination processing S405, it is determined that the template matching is successful, in a case where the first matching score is a threshold value or more, in a case where the ratio between the first matching score and the second matching score is a threshold value or more, or in a case where both of the conditions are satisfied.

As described above, according to the third embodiment, even when images of alignment marks having different layouts are stored in the alignment image storage unit, a cluster is acquired for alignment marks having a layout by clustering. This arrangement enables generation of a versatile template image from an image of an alignment mark having a similar layout. The third embodiment enables commonality of a template image between a plurality of processes and types, so that the recipe-creation man-hour of the user can be reduced, similarly to the first embodiment.

The wafer observation device according to each embodiment, includes the versatile template generation unit that generates, with input of at least one image, a versatile template image such that the matching score is high at an alignment mark part in an input image and the matching score is low at the part that is not the alignment mark part. That is, the versatile template generation unit cuts out a first region in which the similarity level (matching score) to the template image is a first similarity level and a second region in which the similarity level to the template image is a second similarity level different from the first similarity level, from the input image including an alignment mark, to generate a versatile template image.

At this time, the versatile template generation unit generates a versatile template image to be used in common between different types or different manufacturing processes as the versatile template image.

For example, the alignment mark included in the first region having the first similarity level is used for a first type or a first manufacturing process, and the alignment mark included in the second region having the second similarity level is used for a second type different from the first type or a second manufacturing process different from the first manufacturing process.

For example, the versatile template generation unit extracts, as the second region, a region having the second similarity level lower than the first similarity level. The versatile template generation unit generates a plurality of combinations of the alignment mark included in the input image, as the versatile template image.

According to each embodiment, a versatile template image usable as a template image in alignment for wafers having a plurality of processes and types, can be generated. The template image can be automatically registered in a recipe. Thus, the recipe-creation man-hour of the user can be reduced. The template image can be rendered in commonality between a plurality of processes and types, so that the recipe-creation man-hour of the user can be reduced.

What is claimed is:
1. A wafer observation device comprising:
a processor including a memory and a control component and configured with a versatile template generation function to generate a versatile template image with reference to a plurality of similarity levels between an alignment image including an alignment mark to be used for alignment of a semiconductor wafer and a template image including the alignment mark, the plurality of similarity levels being acquired from the alignment image scanned with the template image, the processor further configured to perform:
a matching execution function to perform matching between the template image and the alignment image, by a calculation of a first and a second similarity level based upon the scan of the alignment image with the template image; and
a matching success determination function to determine whether the matching is successful, based on a result of the matching performed by the processor configured with the matching execution function,
wherein the processor configured with the versatile template generation function cuts, from the alignment image including the alignment mark, a first region with the first similarity level to the template image and a second region with the second similarity level to the template image different from the first similarity level, and
wherein the processor configured with the versatile template generation function combines the first region and the second region to generate the versatile template image.

2. The wafer observation device according to claim 1, wherein the processor configured with the versatile template generation function generates, as the template image, the versatile template image to be used in common between different types or between different manufacturing processes.

3. The wafer observation device according to claim 2, wherein the alignment mark included in the first region having the first similarity level is used in a first type or a first manufacturing process, and
the alignment mark included in the second region having the second similarity level is used in a second type different from the first type or a second manufacturing process different from the first manufacturing process.

4. The wafer observation device according to claim 1, wherein the processor configured with the versatile template generation function extracts, as the second region, a region having the second similarity level lower than the first similarity level.

5. The wafer observation device according to claim 1, wherein the processor configured with the versatile template generation function generates, as the versatile template image, a plurality of combinations of the alignment mark included in the input image.

6. The wafer observation device according to claim 1, further comprising:
an input and output terminal configured to display an input image selection screen on which a user selects the input image,
wherein the processor configured with the versatile template generation function generates the versatile template image with at least one image selected as the input image by the input and output terminal from a plurality of alignment images.

7. The wafer observation device according to claim 1, the processor further configured to perform:
a clustering execution function configured to perform clustering to a plurality of alignment images for a plurality of versatile template images; and
a suitable-template presence determination function configured to determine whether a versatile template image suitable to the type or the manufacturing process is present in the plurality of the versatile template images subjected to the clustering,
wherein the processor configured with the versatile template generation function generates, every cluster subjected to the clustering, the versatile template image with an image included in the cluster as the input image.

8. The wafer observation device according to claim 1, wherein in a case where a layout of the alignment mark in the alignment image has a first L-shaped pattern, the processor configured with the versatile template generation function generates, as the template image, the versatile template image including a second L-shaped pattern having a brightness value identical in positive and negative to a brightness value of the first L-shaped pattern and third L-shaped patterns having a brightness value inverse in positive and negative to the brightness value of the first L-shaped pattern, at upper left, lower left, upper right, and lower right positions to the second L-shaped pattern.

9. The wafer observation device according to claim 1, wherein in a case where a layout of the alignment mark in the alignment image has a first cross-shaped pattern, the processor configured with the versatile template generation function generates, as the template image, the versatile template image including a second cross-shaped pattern having a brightness value identical in positive and negative to a brightness value of the first cross-shaped pattern and third cross-shaped patterns having a brightness value inverse in positive and negative to the brightness value of the first cross-shaped pattern, at upper left, lower left, upper right, and lower right positions to the second cross-shaped pattern.

10. The wafer observation device according to claim 1, the processor further configured to perform:
an image acquisition function configured to acquire the alignment image;
the wafer observation device further comprising:
an alignment image storage device configured to store the alignment image acquired by the processor configured with the image acquisition function; and
a versatile template image storage device configured to store the versatile template image,
wherein the processor configured with the versatile template generation function generates the versatile template image with the alignment image stored in the alignment image storage device, and stores the versatile template image in the versatile template image storage device.

* * * * *